Patented Apr. 10, 1951

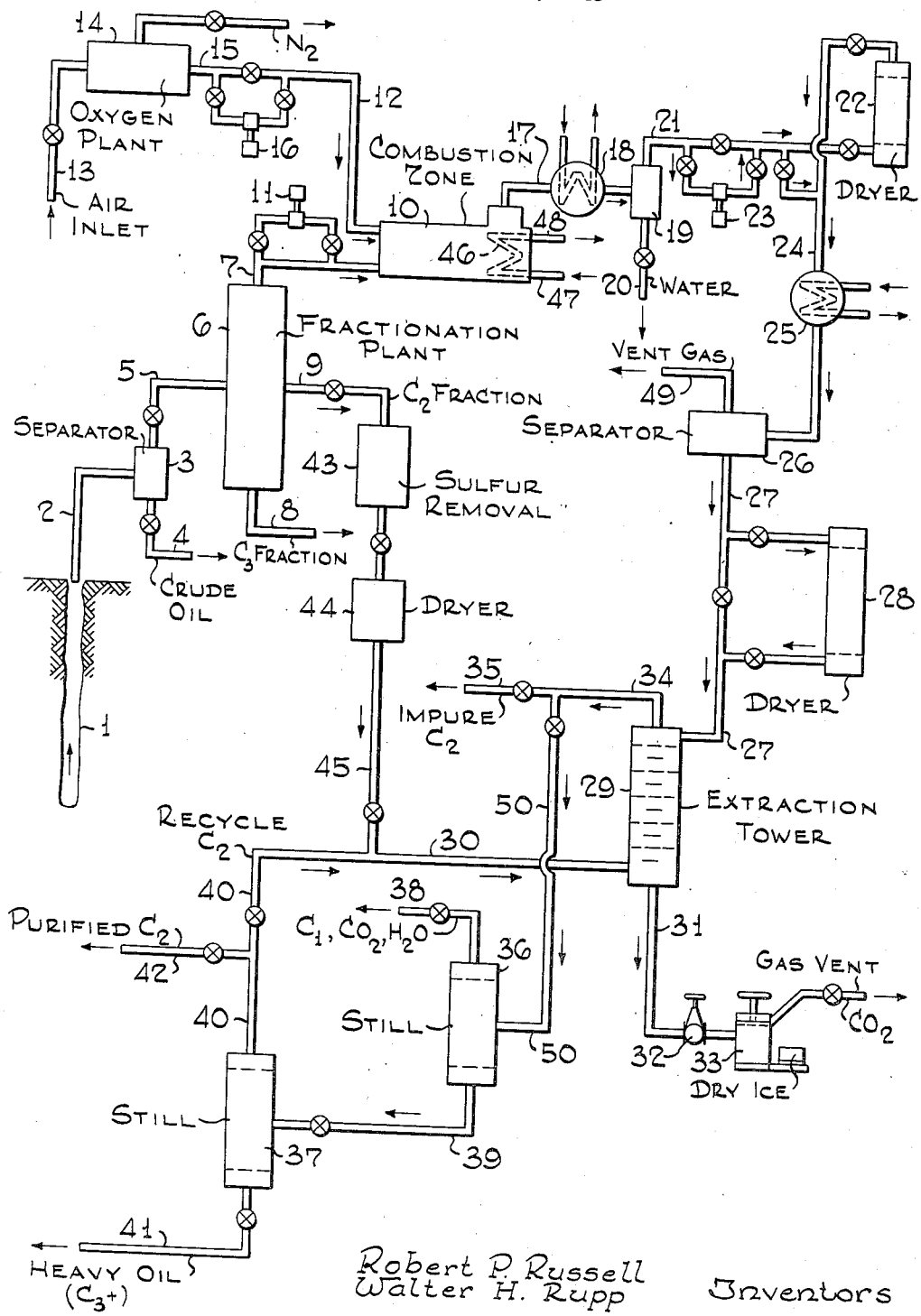

2,548,498

UNITED STATES PATENT OFFICE 2,548,498

PRODUCTION OF DRY ICE FROM NATURAL GAS

Robert P. Russell and Walter H. Rupp, Mountainside, N. J., assignors to Standard Oil Development Company, a corporation of Delaware Application February 17, 1948, Serial No. 8,767

4 Claims. (Cl. 62—170)

This invention relates to the production of solid carbon dioxide from raw natural gas containing gaseous to heavy crude oil hydrocarbons. In accordance with the invention, the well fluid of a petroleum well is separated into a gas cut of substantially fixed gases and methane, an ethane cut, and a $C_3$ and heavier hydrocarbon cut. The fixed gas and methane cut is burned with substantially pure oxygen to form carbon dioxide. The ethane cut is then used in a liquid phase process to purify the $CO_2$. The purified carbon dioxide is then sublimed and pressed to form solid carbon dioxide, or Dry Ice.

At the present time carbon dioxide in the form known as Dry Ice is becoming increasingly important as a refrigerant. In this capacity it is principally used in the preservation of foods. As a result of the direct contact of the carbon dioxide with food stuffs, it is essential that the Dry Ice employed as a refrigerant be of exceedingly high purity. It is necessary that the Dry Ice be colorless, odorless, tasteless, and non-toxic. For this reason the initial purity of the carbon dioxide and the purification of the carbon dioxide used in the preparation of Dry Ice is very important.

At the present time carbon dioxide used in the production of Dry Ice is obtained from carbon dioxide rich natural gases, as a by-product of fermentation processes, by the combustion of various gases, cokes, or oil fuels, or by the decomposition of limestone. In all of these cases, it is necessary to subject the carbon dioxide to various purification processes. In particular, it is generally necessary to remove any sulfur compounds present, to remove excess water, and to remove heavy hydrocarbon constituents. Conventionally purification is carried out by a three step process in which each of the above constituents is extracted by a particular chemical reagent. The process is always carried out in the gas phase.

The present invention differs from the conventional process hereinbefore described in that a novel source of $CO_2$ is employed, yielding carbon dioxide of relatively high concentration. This carbon dioxide is then purified by a liquid phase process which is effective to remove undesirable odor and taste contaminants and to provide the desired purity in a one step process.

The invention will be more fully understood from the following detailed description in connection with the accompanying drawing which diagrammatically shows a flow system embodying this invention.

Referring to the drawing, 1 designates a gas or oil well such as is encountered in the search for petroleum. The fluids from well 1 are withdrawn from the well through line 2, and are introduced to separator 3, wherein the normally liquid fractions are separated from the normally gaseous. Crude oil is withdrawn from the bottom of separator 3, through line 4, and the gaseous fractions are withdrawn overhead through line 5. The gaseous fractions so withdrawn may be subjected to fractionation in a conventional casinghead recovery plant or equivalent refinery plant equipment indicated by the numeral 6. The most volatile fraction obtained from fractionation zone 6 comprises methane, hydrogen and fixed gases, which may be withdrawn through line 7. The least volatile fraction comprises $C_3$ hydrocarbons and heavier hydrocarbons which may be withdrawn as a bottoms product through line 8. The intermediate fraction comprises $C_2$ hydrocarbons which are withdrawn through line 9. As indicated, suitable methods for securing the fractionation of the $C_1$, $C_2$ and $C_3$ hydrocarbons are well known. As diagrammatically illustrated in the drawings, this fractionation may conveniently be conducted in a fractionation zone 6 provided with a large number of horizontally disposed, vertically spaced bubble cap fractionating plates or their equivalent. The $C_1$, $C_2$ and $C_3$ hydrocarbons are introduced to an intermediate point of the fractionator and the heat requirements of the fractionation are supplied in any desired manner, as for example, by withdrawing the bottoms product, heating the bottoms product and recirculating a portion of the bottoms product to the fractionation zone. By virtue of the standard principles of distillation, the fractionation occurring will cause a selective progression of the $C_1$ hydrocarbons to the top of the fractionation zone and of the $C_3$ hydrocarbons to the bottom of the fractionation zone. This will further permit the selective segregation of $C_2$ hydrocarbons at intermediate portions of the fractionator preferably partitioned from the feed inlet by vertical baffles. Consequently, as indicated, a gaseous $C_1$ fraction may be withdrawn through line 7, a liquid sidestream product constituting $C_2$ hydrocarbons may be withdrawn through line 9, and a liquid bottoms product constituting the $C_3$ hydrocarbons may be withdrawn from the bottom of the fractionator. It is apparent that, if desired, several fractionation stages may be employed to secure this same objective. Thus, for example, in a first fractionation stage, $C_1$ hydrocarbons may be removed as an overhead product while C₂ and C₃ hydrocarbons may be removed as a bottoms product. In the second fractionation stage, the C₂ and C₃ hydrocarbons may then be segregated by causing removal of the C₂ hydrocarbons as an overhead product and removal of the C₃ hydrocarbons as a bottoms product. In accordance with the present invention the most volatile fraction comprising principally methane is withdrawn through line 7, and is introduced to a combustion zone 10 wherein the hydrocarbon constituents are converted to carbon dioxide. The gas so introduced may, if desired, be compressed in the compressor 11 to the desired pressure under which the combustion zone is operated. Oxygen is introduced to the combustion zone through line 12. It is a particular feature of the process of this invention that the oxygen used be of relatively high purity. As indicated by the drawing, the oxygen system comprises an air purification plant wherein air is introduced through line 13 to a conventional oxygen separation and fractionation plant 14, wherein the air is liquefied to fractionate the oxygen and nitrogen, providing oxygen of about 95–97% purity which may be withdrawn through line 15. The oxygen plant employed is of conventional design and as it is no part of the present invention, no detailed description is herein made as to its nature. The oxygen may be compressed in compressor 16 to the pressure employed in the combustion zone 10. Combustion zone 10 is operated to provide controlled burning of the methane at conditions ranging between 1400 to 2500° F., and at a pressure between 0 and 1000 p. s. i., gauge. It is preferred that a temperature of about 2000° F., and a pressure of about 300 to 500 p. s. i., gauge be employed. Cooling tubes 46 are located in the combustion zone to control the temperature of combustion by vaporizing water introduced in line 47 to form steam which is withdrawn thru line 48. A molal ratio of oxygen to methane of about 2–1 is desirable, plus a slight excess of oxygen. As described, the methane fraction obtained from fractionation plant 6 and the oxygen obtained from the oxygen plant 14 may be recovered under sufficient pressure to meet the requirements of the combustion zone without additional compression. It is for this reason that compressors 11 and 16 have been indicated as being optional. The combustion of the methane using the high purity oxygen in the combustion zone 10 is carried out to convert 95–100% of the methane and is effective to provide carbon dioxide of relatively high purity which may be readily purified to a product suitable for conversion to Dry Ice. The combustion product consisting of carbon dioxide, water vapor and some unreacted feed gas is withdrawn from the combustion zone through line 17, and is passed to cooler 18, wherein the temperature of the combustion products is dropped to a point sufficient to condense substantially all of the water vapor present. This temperature is so chosen that at the conditions of pressure existing in the combustion zone, and throughout the system heretofore described, no liquefaction of the carbon dioxide will occur. The cooled stream of gas is then conducted from cooler 18 to separator 19, wherein the condensed water may be separated from the carbon dioxide gas. Water may be withdrawn through line 20 and the carbon dioxide gas may be withdrawn overhead through line 21. The carbon dioxide rich gas has a composition of about 85 to 95% carbon dioxide and about 15 to 5% nitrogen, carbon monoxide, and oxygen plus traces of sulfur compounds, water vapor and hydrocarbons. As desired, or necessary, the carbon dioxide may be further dried in drier 22 which may consist of an alumina, silica gel, or similar type of drier. Compressor 23 may be utilized prior to treatment in the drying tower 22 to supply sufficient pressure so that condensation of the CO₂ may be brought about in case the combustion zone 10 is operated at a pressure below that desired for liquefaction of the CO₂. As stated before, it is not necessary to employ the compressor 23 if the gas from the well, through the combustion zone, and the remainder of the process has been maintained at a sufficiently high pressure. The carbon dioxide gas from the separator 21, then, is either passed through, or is bypassed the drier 22 and is conducted through line 24 to cooler 25. Cooler 25 may be any desired type of cooler, and may conveniently be a cold water heat exchanger. It is necessary that the cooler have sufficient capacity to condense the carbon dioxide at the pressure under which it is maintained. For example, if the carbon dioxide throughout the system has been held at a pressure of 500 p. s. i., gauge, condensation will occur on cooling to 32° F. Similarly if the pressure of the carbon dioxide is maintained at 1100 p. s. i., gauge, then cooling to 80° F., will be sufficient to liquefy the carbon dioxide. Liquid carbon dioxide is withdrawn from cooler 25 and is introduced to separator 26 wherein any uncondensed gas may be removed overhead through line 49. The liquid carbon dioxide is then withdrawn from separator 26 through line 27. Again, the liquid carbon dioxide may be passed through a drier 28 similar to drier 22, or may bypass this drier. Both drier 22 and drier 28 are utilized to critically adjust the water content of the carbon dioxide. It is desirable to remove all excess water which would have the effect of freezing valves, causing corrosion, etc. However, a trace of water is desirable insofar as a very small proportion of water is effective in improving the crystalline structure of the final Dry Ice product. The liquid carbon dioxide is conducted through line 27 into the extraction tower 29. This tower may have plates, bubble caps, packing, or any of the conventional equipment to secure thorough liquid to liquid mixing. The tower may alternatively consist of a turbo mixer, or equivalent high speed mixing equipment. As illustrated in the drawing, when employing an extraction tower, the liquid carbon dioxide is introduced to the top of the tower, and flowing downwardly through the tower contacts a stream of liquid C₂ hydrocarbons introduced to the bottom of the tower through line 30 which flows upwardly through the tower. Contact of the liquid C₂ hydrocarbons with the liquid carbon dioxide is carried out at 0 to 80° F. temperature and pressures of 300–1100 p. s. i. g. A preferred range is 32 to 80° F., and 500 to 1100 p. s. i. g. This operation is effective to substantially remove sulfur compounds, traces of water, and heavy oils, rendering the carbon dioxide substantially pure. About 10–200% by volume of the carbon dioxide is required to obtain satisfactory purification. The exact percentage will depend upon the initial impurities of the carbon dioxide. The pure carbon dioxide is withdrawn from the bottom of the extraction tower through line 31, and is conducted to throttling valve 32. This valve is operated so as to sharply drop the pressure of the liquid carbon dioxide to a point where the carbon dioxide will be converted to solid form. A pressure of about 0 to 60 p. s. i. g. is suitable to accomplish this solidification. This pressure reduction causes the carbon dioxide to cool to such an extent that carbon dioxide snow is formed. This snow may then be conducted to the conventional type carbon dioxide press 33, wherein the snow may be compressed to the solid block form which is known as Dry Ice.

Returning to the extraction tower 29, the $C_2$ hydrocarbons after contacting the impure carbon dioxide are withdrawn from the top of the tower through line 34. If desired, the impure $C_2$ hydrocarbons may simply be withdrawn through line 35 and may be burned as fuel, or used for any other desired purpose. Alternatively, they may be suitably purified so as to permit recycling in the extraction tower. The purification system illustrated comprises two conventional fractionating zones 36 and 37 with top refluxing and bottom reboiling. The liquid $C_2$ hydrocarbons from the extraction tower 29 are conducted thru line 50 into the first fractionating zone 36 which may be of the reflux type wherein methane, carbon dioxide, and water vapor may be removed overhead through line 38, while $C_2$ hydrocarbons and higher are removed as a bottoms product through line 39. The bottoms product is then introduced into the second fractionating zone 37, wherein $C_2$ hydrocarbons are withdrawn overhead through line 40 while $C_3$ and heavier hydrocarbons are withdrawn as a bottoms product through line 41. The bottom fraction comprising heavy oils carries with it substantially all of the impurities removed from the carbon dioxide. Consequently, the $C_2$ fraction withdrawn from the top of the tower is substantially pure and may be recycled to the extraction tower through lines 40 and 30. Alternatively, the purified $C_2$ hydrocarbons may be withdrawn through line 42 and may be used for synthesis purposes, or for any other purpose.

The $C_2$ hydrocarbons employed in the extraction tower initially consist of the $C_2$ fraction of the crude natural gas as obtained from the fractionation plant 6, through line 9. The $C_2$ fraction may be initially purified by conducting the liquid hydrocarbons through sulfur removing vessel 43 and drier 44. Caustic, bauxite, amines, or equivalent reagents may be employed in vessel 43 to remove the sulfur compounds. Similarly, alumina, florite, silica gel, or equivalent drying agents may be employed in drier 44 to dry the $C_2$ hydrocarbons. As purified, the $C_2$ fraction may be introduced to line 30 through line 45 for utilization in the extraction tower hereinbefore described.

As described, the present invention relates to an integrated process for employing the well fluids of a petroleum oil well, or of a natural gas well to provide carbon dioxide suitable for Dry Ice manufacture. The well fluids are fractionated so as to provide separate $C_1$ and $C_2$ fractions. The $C_1$ fraction is burned with substantially pure oxygen to provide carbon dioxide. The $C_2$ fraction is subjected to initial purification and is then caused to contact the carbon dioxide so as to purify the carbon dioxide sufficiently to provide high quality Dry Ice. A characteristic of this process is the employment of relatively pure oxygen for the combustion of the $C_1$ fraction, whereby the subsequent purification process is materially simplified. A second characteristic of the process is that the purification of the carbon dioxide is carried out in the liquid phase employing both liquid carbon dioxide and liquid $C_2$ hydrocarbons. A still further feature is that the entire process may be conducted at high pressures. Consequently, providing that the source of well fluids delivers high pressure constituents, little or no subsequent compression is required. It will be noted by those skilled in the art that the process described is furthermore adaptable to efficient heat exchange so that it may be operated at a high degree of efficiency.

Having now fully described the present invention, what is claimed is:

1. The process of producing Dry Ice from petroleum and natural gas well fluids, which comprises separating said fluids into at least a $C_1$ and $C_2$ fraction, burning said $C_1$ fraction, using oxygen of at least 95% purity to produce carbon dioxide, liquefying said carbon dioxide, purifying the said $C_2$ fraction, contacting the $C_2$ fraction in liquid phase with the liquefied carbon dioxide fraction, at a pressure of about 300 to 1100 pounds per square inch withdrawing liquid carbon dioxide after said contact, and sharply dropping the pressure under which the liquid carbon dioxide is maintained, whereby evaporation and cooling of the carbon dioxide occurs with consequent formation of carbon dioxide snow, and compressing said carbon dioxide snow.

2. The process defined by claim 1 wherein the $C_2$ fraction, after contact with the liquid carbon dioxide is fractionated to provide substantially pure $C_2$ hydrocarbons which are recycled to the said contacting step.

3. The process of claim 1 wherein the $C_1$ fraction is burned at a temperature of about 1400 to 2500° F. at a pressure between 0 to 1000 p. s. i. g.

4. The process of producing Dry Ice from petroleum oil and natural gas well fluids which comprises separating said fluids into at least a $C_1$ and a $C_2$ fraction, burning said $C_1$ fraction at a temperature in the range of 1400° to 2500° F. and a pressure in the range of 300 to 500 lbs. per square inch, employing oxygen of at least 95% purity to produce carbon dioxide, liquefying said carbon dioxide, purifying the said $C_2$ fraction, contacting the liquefied carbon dioxide with 10–200% by volume of the $C_2$ fraction in liquid phase whereby sulfur compounds and heavy oils are removed from the carbon dioxide, withdrawing the liquid carbon dioxide after said contact, and sharply dropping the pressure under which the liquid carbon dioxide is maintained, whereby evaporation and cooling of the carbon dioxide occurs with consequent formation of carbon dioxide snow, and compressing said carbon dioxide snow.

ROBERT P. RUSSELL.
WALTER H. RUPP.

REFERENCES CITED

The following references are of record in the file of this patent:

UNITED STATES PATENTS

| Number | Name | Date |
|---|---|---|
| 1,804,432 | Pollitzer | May 12, 1931 |
| 1,863,263 | Belt | June 14, 1932 |
| 2,016,815 | Gilmore | Oct. 8, 1935 |
| 2,039,330 | McKee | May 5, 1936 |

FOREIGN PATENTS

| Number | Country | Date |
|---|---|---|
| 263,922 | Great Britain | Jan. 3, 1927 |